Feb. 6, 1951     H. A. CARLSON     2,540,609

WINDSHIELD WIPER CONTROL

Filed Aug. 24, 1945

INVENTOR
HAROLD A. CARLSON
BY
George R. Ericson
ATTORNEY

Patented Feb. 6, 1951

2,540,609

UNITED STATES PATENT OFFICE 2,540,609

WINDSHIELD WIPER CONTROL

Harold A. Carlson, University City, Mo., assignor to Carter Carburetor Corporation, St. Louis, Mo., a corporation of Delaware Application August 24, 1945, Serial No. 612,453

6 Claims. (Cl. 116—58)

This invention relates to a combination windshield wiper control and brake indicator for automotive vehicles.

When the operator attempts to drive his car with the emergency or parking brake applied, as frequently happens, loss of power and the heating of the brake bands cause considerable annoyance and, in addition, excessive wear of the band. Various brake indicators heretofore tried have not been wholly successful because they are difficult to apply or they have not been readily noticeable by the operator.

An object of the present invention is to provide a combination windshield wiper control and emergency brake indicator which utilizes the motion of the windshield wiper to indicate the condition of the brake.

A more detailed object is to provide means for causing the windshield wiper to operate when the driver attempts to operate the vehicle without releasing the parking brake.

Figure 1:
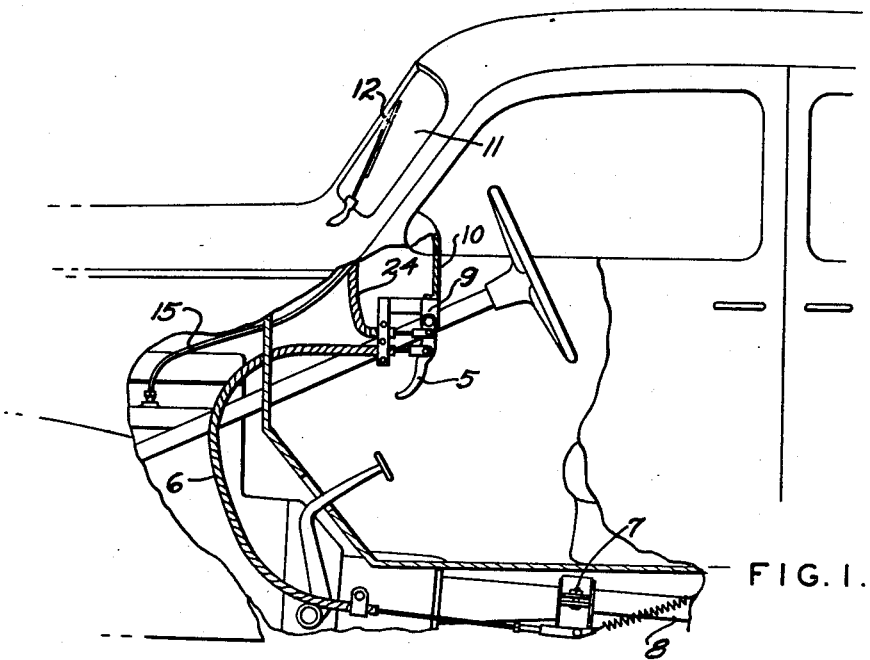

These objects and other more detailed objects hereafter appearing are attained by the device illustrated in the accompanying drawing in which Fig. 1 is a side view of a portion of an automobile having the invention applied thereto, parts being broken away for clearer illustration.

Figure 2:
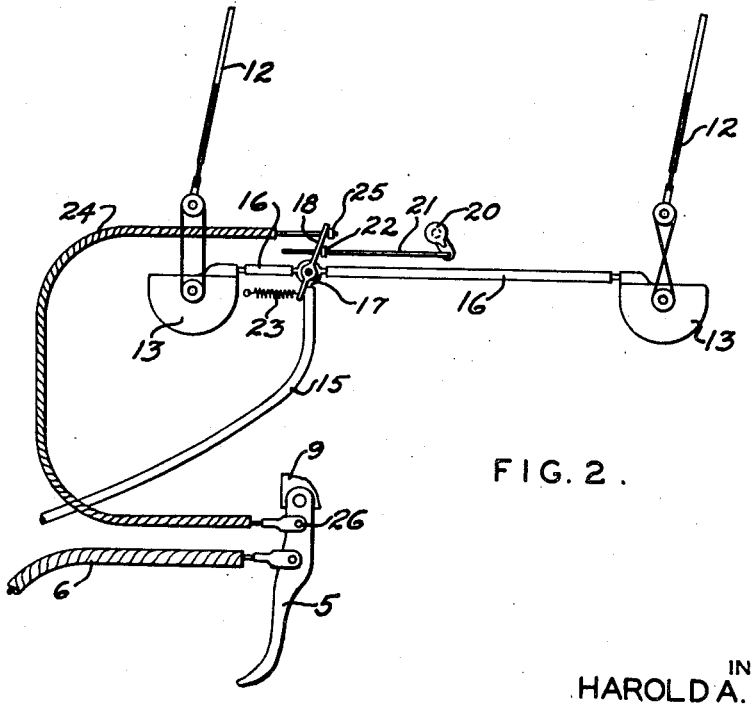

Fig. 2 is a diagram representing the windshield wiper valve control.

The automobile in Fig. 1 has a lever 5 attached to the emergency brake cable 6 extending to the brake drum located within housing 7 on the drive shaft 8. The lever is pivoted to a bracket 9 attached beneath the dash board 10. Applied to the windshield 11 are wiper blades 12 operated by motors 13. The motors are connected to a source of suction, such as the engine intake manifold, by a tube 15 having branches 16. A valve 17 located at the intersection of the tube and branches controls the application of suction to the motor. The valve has an operating lever 18, which, in the position shown in Fig. 2, cuts off the suction. When the lever is moved counterclockwise, the valve is opened and suction is applied to the motor to cause operation of the blades back and forth across the windshield in the usual manner.

A manual control button 20 is mounted on the dash board in a convenient position and actuates a rod 21 which extends through an opening in lever 18 and has a collar 22 forming a one way connection for moving the lever in the direction to open the suction line. The lever is automatically urged in the opposite direction to cut off the suction by a coil spring 23.

A guided wire cable 24 of the Bowden type also extends through an opening in lever 18 and has a collar 25 positioned to form a one way connection to move the lever counterclockwise for opening the suction line. Cable 24 is connected at 26 to emergency brake lever 5 so that movement of the brake lever to apply the brakes also rotates lever 18 counterclockwise and opens the wiper control valve. Release of the brake moves collar 22 away from the lever 18 and, if button 20 is in the off position, lever 18 will automatically return to the closed position.

Thus, whenever the engine is operating and the emergency brake applied, the windshield wipers will operate to indicate to the driver the brake position. The windshield wiper blade is a very effective indication as it is directly in the line of vision of the operator and, consequently, he will be readily informed that the emergency brake should be released or the engine stopped to prevent waste of gasoline. Other types of windshield wiper controls may be used if desired and, connected to the emergency brake in the manner described. The wiper motor, in this instance, is utilized to sense the running condition of the engine and provides an indication, by moving the wiper blades, if the emergency brake is not released. However, another instrumentality which responds or shifts, or is shifted incident to the running condition of the engine, such as a switch sensitive to manifold or oil pressure, may serve as a control for the wiper motor and may be, itself, controlled by the emergency brake or may cooperate with the emergency brake to obtain the stated result.

The invention may be modified in various respects as will occur to those skilled in the art and the exclusive use of all modifications as come within the scope of the appended claims is contemplated.

I claim:

1. In a motor vehicle, a brake, a motor operated windshield wiper, a control for said windshield wiper motor and operative connections between said wiper control and brake for causing operation of said motor operated wiper whenever the vehicle motor is in operation and said brake applied.

2. In a motor vehicle, a parking brake, a windshield wiper, means for operating said wiper when the vehicle motor is in operation, a manual control for said means, and an operative connection between said brake and said control for causing operation of said wiper when said brake is applied.

3. In a motor vehicle, an instrumentality subject to different conditions when the vehicle motor is running and wh
a windshield wiper, mean
ning condition of said inst
ing said wiper, a parkin
therefor, and an operati
said means and said con
tion of said wiper when
in said running conditi
applied.

4. In a motor vehicle, a
shield wiper, a parking br
the application of suction
control for said valve, and
tion between said contro
causing operation of the
is applied.

5. In a motor vehicle,
means to operate said wip
rived from the vehicle mo
the wiper suction, a park
erative connection betwee
said brake for opening sai
is applied.

6. In a motor vehicle h
bustion engine, a windshie